W. F. PEREZ.
AUTOMOBILE FENDER.
APPLICATION FILED OCT. 11, 1913.
1,157,251.
Patented Oct. 19, 1915.
3 SHEETS—SHEET 3.
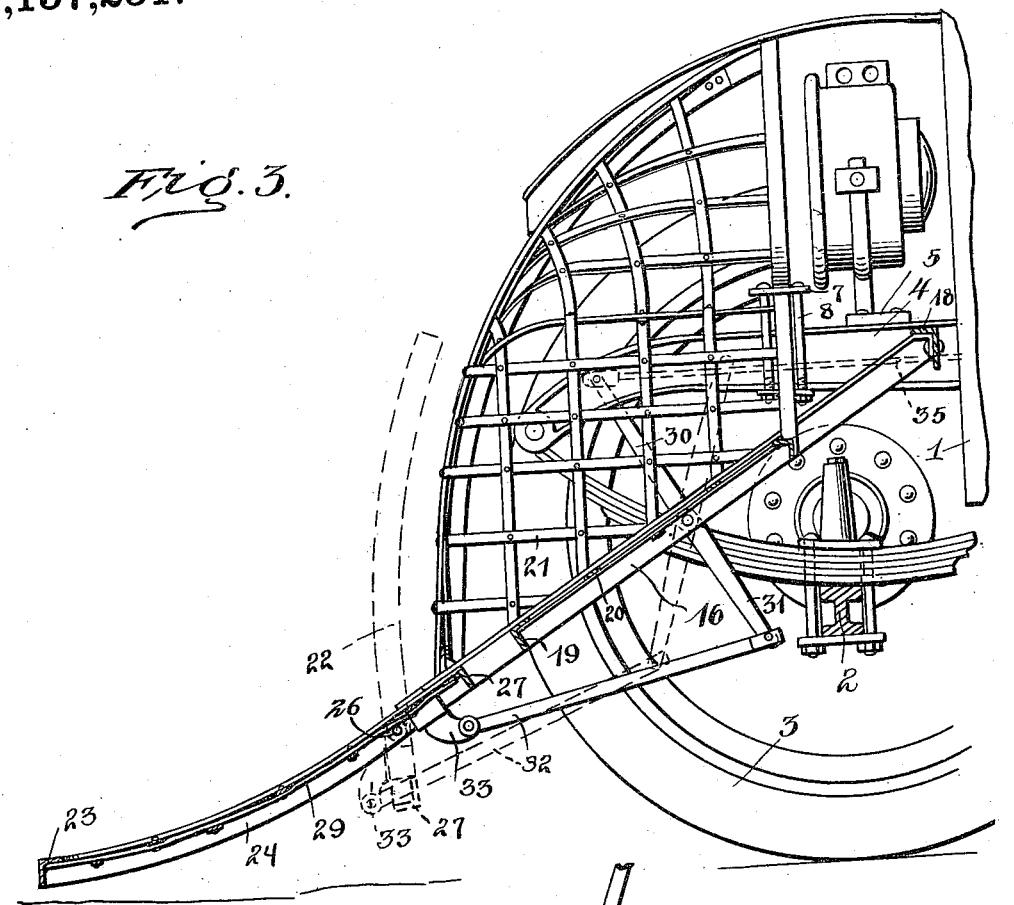
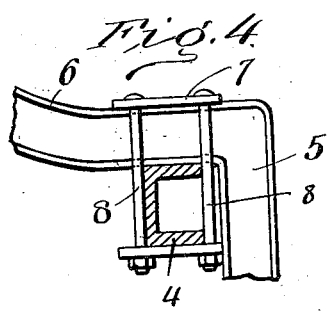
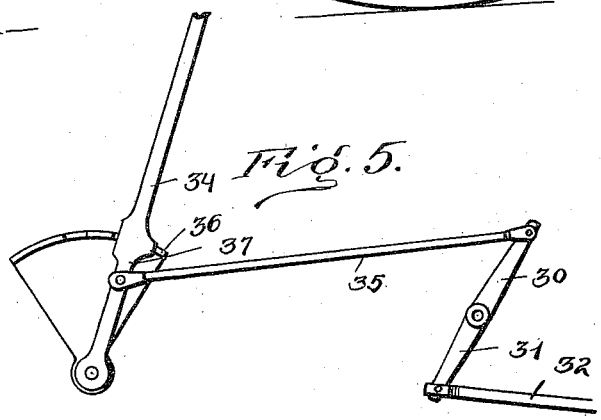
Inventor
W. F. Perez
Witnesses
By
Attorneys

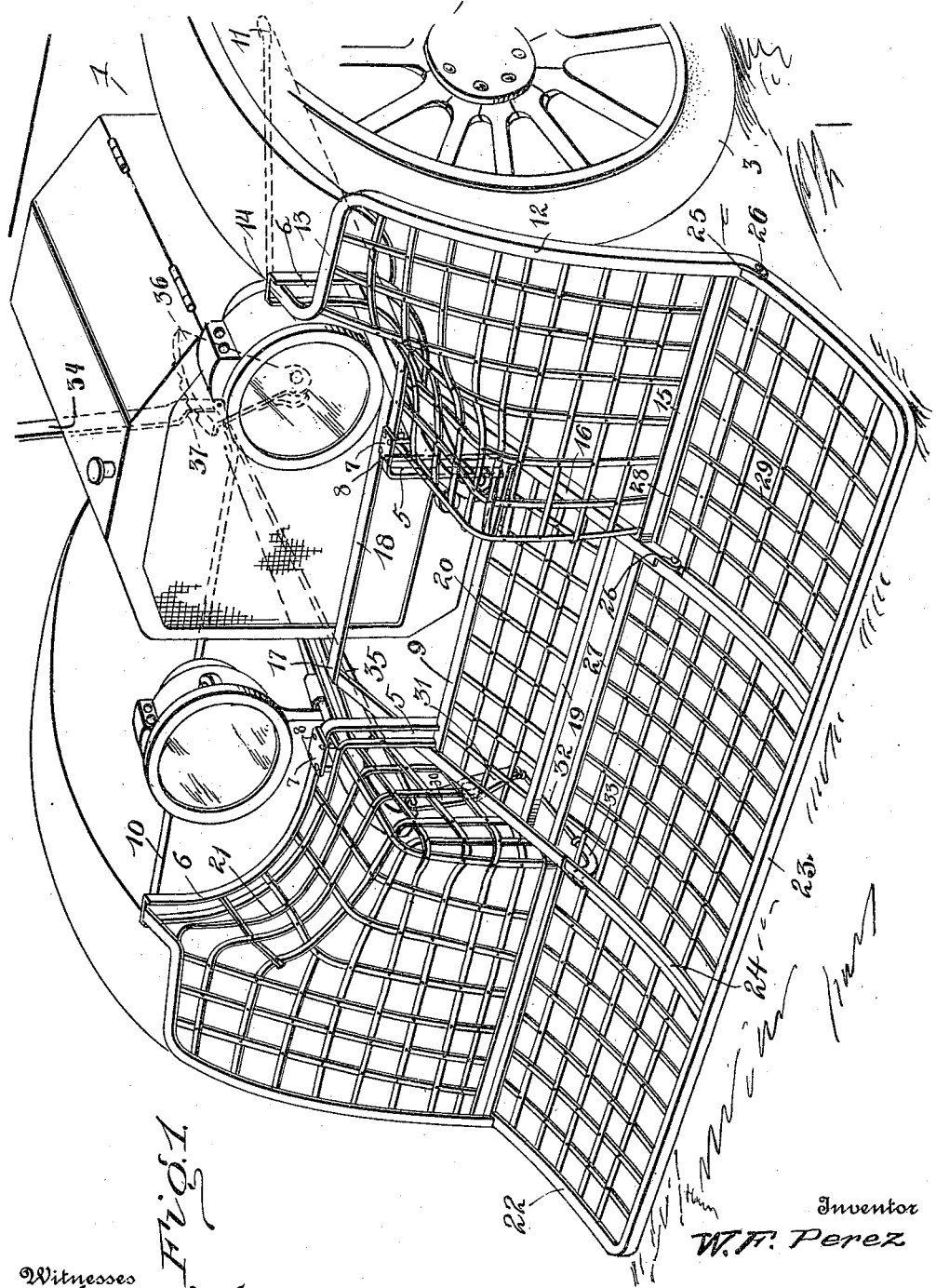

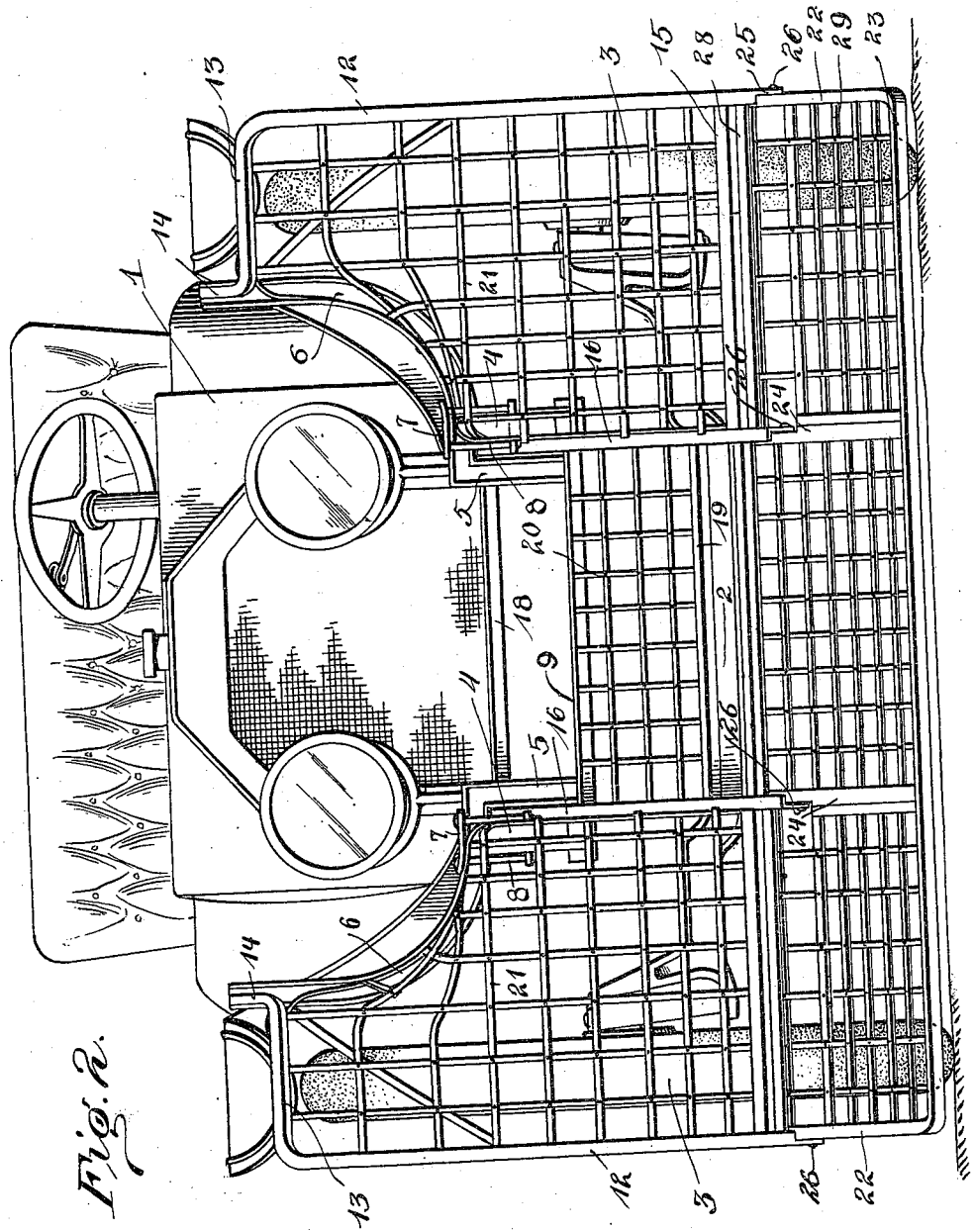

UNITED STATES PATENT OFFICE.

WALDO F. PEREZ, OF CHICAGO, ILLINOIS, ASSIGNOR TO THE STANDARD FENDER COMPANY, INC., OF CHICAGO, ILLINOIS, A CORPORATION OF DELAWARE.

AUTOMOBILE-FENDER.

1,157,251.

Specification of Letters Patent.  Patented Oct. 19, 1915.

Application filed October 11, 1913. Serial No. 794,672.

*To all whom it may concern:*

Be it known that I, WALDO F. PEREZ, citizen of the United States, residing at Chicago, in the county of Cook and State of Illinois, have invented certain new and useful Improvements in Automobile-Fenders, of which the following is a specification.

This invention relates to fenders for automobiles and has as its object to provide a fender which when in lowered position will have its forward or engaging end located close to the ground surface so as to provide against the liability of a person struck falling beneath the wheels but which will, when in raised position, be out of position to be struck by obstacles in the road surface, whereby to permit of the vehicle being driven over rough roads.

It is another aim of the invention to provide a fender so constructed that it may be readily applied to practically any automobile without altering the construction of the vehicle or necessitating the drilling of a number of holes in the frame thereof.

The invention further aims to provide a fender for automobiles of such form that a person struck by the fender will be carried or thrown toward the center thereof, thereby insuring against being run over by the wheels of the car.

A further aim of the invention is to provide means for adjusting the forward or engaging end of the fender in accordance with the road conditions so that the fender may be positioned close to the road surface or elevated a considerable distance above the same as may be desired.

In the accompanying drawings: Figure 1 is a perspective view of the fender embodying the present invention. Fig. 2 is a front elevation thereof. Fig. 3 is a vertical front to rear sectional view of the fender. Fig. 4 is a view partly in elevation and partly in section, illustrating the manner in which the frame of the fender is mounted upon the chassis frame of the car. Fig. 5 is a detail view in side elevation of the lever mechanism for adjusting the fender.

In the drawings the body of the car is indicated in general by the reference numeral 1, the front axle by the numeral 2, the wheels by the numeral 3, and the side bars of the chassis frame by the numeral 4.

The fender comprises a relatively rigid portion which is mounted upon the chassis frame and a foldable forward or engaging portion supported by the rigid portion. The said rigid portion of the fender includes essentially a frame, the rear portion of which includes side members 5 preferably of channel iron, each having integral with its upper end a laterally and upwardly curved arm 6 and these said side portions are disposed at their upper ends against the inner sides of the side bars 4 of the chassis frame, with the lower ends of their arms 6 resting upon the upper sides of the side bars and are held in place by means of clip plates 7 and bolts 8 which are secured through the plates at opposite sides of the said ends of the arms 6 and at opposite sides of the respective side bars of the chassis. By securing the frame members in the manner stated the drilling of bolt holes through the bars 4 is obviated. The lower ends of the side bars 5 are connected by a cross frame bar 9 and the upper ends of the arms 6 are braced by means of brace rods 10 secured at one end thereto and at their other ends to the side bars 4 as indicated at 11. The rigid frame portion also includes sides 12 which for the greater portions of their lengths are gradually curved with their concave sides presented toward and in advance of the wheels 3 and their convex sides presented forwardly and at their upper ends the said side bars 12 are each turned inwardly laterally as at 13 and thence rearwardly as at 14 and secured to the upper ends of the arms 6. The laterally extending portion 13 of each side member 12 extends in front of the upper forward end of the mud guard at the respective side of the machine, the major portion of each side member and the rearwardly extending portion 14 being located at opposite sides of the said mud guard. Frame bars 15 are secured at their outer ends to the side members 12 at the lower ends of the latter and at their inner ends to intermediate frame bars 16 which extend in parallel relation upwardly and rearwardly and are secured at their upper and rear ends as at 17 to a cross bar 18 in turn secured at its ends to the chassis bars 4. The intermediate frame bars 16 are connected by the frame bar 9 as well as by a cross bar 19 extending parallel to the bar 9 and in front thereof.

The supporting mesh or web of the fender may be formed from wire, rods, strap iron, or, in fact, any material suitable for the purpose, and it will be observed by reference to Figs. 1 and 2 of the drawings that that portion of the frame bounded by the cross bar 9, the intermediate bars 16, and the cross bar 19, is provided with a supporting web or filling 20, that portion of the frame bounded by the side bars 12, the intermediate bars 16, the side bars 5 and their respective arms, and the frame bars 15, being provided with a supporting web or filling 21, both webs or fillings in the present instance being formed from interwoven strap iron. It is preferable that the webs or fillings 21 be shaped as shown in Figs. 1 and 2 of the drawings so as to provide a surface sloping downwardly from the portions 13 and 14 of the side members 12 of the frame and toward the intermediate or central web 20, the plane of which is considerably below the upper portions of the fillings 21. It is to be noted that the portions of the webs 21 which are secured to the side bars 5 constitute substantially vertical walls located at the opposite sides of the web or filling 20 and at the bottoms of the sloping surface portions above mentioned, so that a person struck by the fender and falling upon either of the sloping portions will be directed on to the surface 20 and held between the vertical portions of the web or filling 21.

The forward or folding portion of the fender consists of a frame, the sides of which are indicated by the numeral 22, they being rearward extensions of the forward frame bar indicated at 23. This frame also includes intermediate frame bars 24 which extend parallel to each other and to the bars 22 and substantially in alinement with the intermediate frame bars 16.

It is preferable that all of the frame bars be of angle iron construction and by reference to Fig. 1 of the drawings it will be observed that the lower end of each frame member 12 has its upper or forwardly presented wing cut away as at 25 as are also the corresponding wings of the intermediate frame bars 16. The projecting portions of the other wings of these bars extend respectively beside the upper or rear ends of the side bars 22 and the intermediate bars 24 and pivots 26 serve to connect said ends of the bars in such manner that when the foldable portion of the fender is in lowered or operative position these pivoted ends will engage behind or beneath the cut away wings of the frame bars 12 and 16 whereby the said portion of the fender will be supported rigid with relation to the first-described portions thereof. It will be apparent, however, that the forward portion of the fender may be swung up and may assume the position shown in dotted lines in Fig. 3 of the drawings. The intermediate frame bars 24 are connected at their rear or upper ends by means of a cross bar 27 and the side bars 22 are connected at their rear ends to the rear ends of the bars 24 by means of cross bars 28. The intermediate and end divisions of the frame of this portion of the fender are provided with supporting webs, indicated by the numeral 29, and corresponding in structure to the supporting webs of the first-described portion of the fender.

As before stated, means is provided for raising and lowering the forward portion of the fender and for holding the same elevated and out of position to strike obstacles in the road, and this means will now be described. Mounted upon one of the intermediate frame bars 16 is a lever having an arm 30 extending above the said frame bar and an arm 31 extending below the same. A rod 32 is connected to the lower end of the arm 31 and to a rigid arm 33 upon the respective frame bar 24. A lever 34 is mounted at the side of the body of the machine and a rod 35 is connected to the arm 30 and to the said lever. The lever is held at adjustment by means of a rack segment 36 beside which the lever rocks, the lever being provided with a tooth 37 coöperating with the said segment. It will now be apparent that by rocking the lever 34 the forward portion of the fender may be raised and lowered and that it may assume a number of positions between the full and dotted line positions shown in Fig. 3 of the drawings.

Having thus described the invention, what is claimed as new is:

1. The combination with the chassis frame of an automobile, of a fender including a frame having frame members disposed one upon each of the side bars of the chassis frame in crossed relation with respect thereto and having a portion curved upwardly and laterally beyond one side of the respective chassis bar, and a portion extending downwardly at the other side of the chassis bar, clip plates disposed one upon each of the frame members and one beneath each of the chassis bars, and bolts secured through the sets of clip plates and extending at opposite sides of the respective chassis bars and at opposite sides of the respective frame members.

2. The combination with the chassis frame of an automobile, of a fender including a frame having frame members disposed one upon each of the side bars of the chassis frame and having a portion curved upwardly and laterally beyond one side of the respective chassis bar, and a portion extending downwardly at the other side of the chassis bar, clip plates disposed one upon each of the frame members and one beneath each of the chassis bars, bolts secured through the sets of clip plates and extending at opposite sides of the respective chassis bars and at opposite sides of the respective frame members, and braces secured to the said curved portions of the frame members and extended rearwardly and connected to the said chassis bars.

3. The combination with the chassis frame of an automobile, of a fender including a frame having frame members disposed one upon each of the side bars of the chassis frame and having a portion curved upwardly and laterally beyond one side of the respective chassis bar, and a portion extending downwardly at the other side of the chassis bar, clip plates disposed one upon each of the frame members and one beneath each of the chassis bars, bolts secured through the sets of clip plates and extending at opposite sides of the respective chassis bars and at opposite sides of the respective frame members, braces secured to the said curved portions of the frame members and extended rearwardly and connected to the said chassis bars, the frame of the fender also including spaced intermediate frame bars extending upwardly and rearwardly between the chassis bars, and a cross bar extending between and secured to the chassis bars rearwardly of the clip plates, the said intermediate frame members being secured at their rear and upper ends to the said curved bar.

4. A fender of the class described, having relatively rigid intermediate and side catching and supporting surfaces, the side surfaces being sloped toward the intermediate surface and being abruptly terminated to provide substantially vertical guard portions at the opposite sides of the said intermediate.

In testimony whereof I affix my signature in presence of two witnesses.

WALDO F. PEREZ. [L. S.]

Witnesses:
CARL C. JENSEN,
FRANK H. ESCHER.

Copies of this patent may be obtained for five cents each, by addressing the "Commissioner of Patents, Washington, D. C."